United States Patent [19]

Harada et al.

[11] Patent Number: 4,708,113

[45] Date of Patent: Nov. 24, 1987

[54] METHOD OF DISCRIMINATING OCTANE NUMBER OF FUEL FOR MOTOR VEHICLE

[75] Inventors: Osamu Harada; Yuji Takeda; Toshio Suematsu; Katsushi Anzai; Kazuhiko Funato, all of Toyota, Japan

[73] Assignee: Toyota Jidosha Kabushiki Kaisha, Aichi, Japan

[21] Appl. No.: 729,809

[22] Filed: May 2, 1987

[30] Foreign Application Priority Data

Sep. 28, 1984 [JP] Japan .................................. 59-203045
Sep. 28, 1984 [JP] Japan .................................. 59-203046
Oct. 1, 1984 [JP] Japan .................................. 59-206030

[51] Int. Cl.⁴ ............................................. F02P 5/15
[52] U.S. Cl. ......................................... 123/425; 73/35
[58] Field of Search ................. 123/425, 435; 73/35

[56] References Cited

U.S. PATENT DOCUMENTS

| | | | |
|---|---|---|---|
| 3,822,583 | 7/1974 | Keller et al. | 73/35 |
| 4,243,007 | 1/1981 | Ehrhardt et al. | 123/425 X |
| 4,586,475 | 5/1986 | Takahashi et al. | 123/425 |
| 4,594,982 | 6/1986 | Takahashi et al. | 123/425 |
| 4,594,983 | 6/1986 | Takahashi et al. | 123/425 |
| 4,612,900 | 9/1986 | Iwata et al. | 123/425 |
| 4,612,901 | 9/1986 | Iwata et al. | 123/425 |

FOREIGN PATENT DOCUMENTS

| | | | |
|---|---|---|---|
| 27886 | 2/1983 | Japan | 123/425 |
| 57-072 | 4/1983 | Japan . | |
| 143169 | 8/1983 | Japan | 123/425 |
| 122275 | 6/1985 | Japan . | |

*Primary Examiner*—Tony M. Argenbright
*Attorney, Agent, or Firm*—Finnegan, Henderson, Farabow, Garrett & Dunner

[57] ABSTRACT

Knocking in an engine is prevented from occurring by retarding an ignition timing. A basic ignition advance angle THB and a correction value THK for retardation of the ignition timing are computed in order that the ignition timing THF is calculated by using the formula THF=THB−THK. The knocking in the engine tends to take place, as the ignition timing advances. Determination is made as to whether the correction value THK is within a reference range AR. When such a determination is that the correction value THK is within the reference range, discrimination is made as to whether an octane number of the fuel to be supplied to the engine is less than a predetermined octane number of the fuel which is optimum for the engine. If the discriminated octane number of the fuel is less than the predetermined octane number, the ignition timing is retarded by 10 degree of a rotational angle of a crank shaft.

28 Claims, 21 Drawing Figures

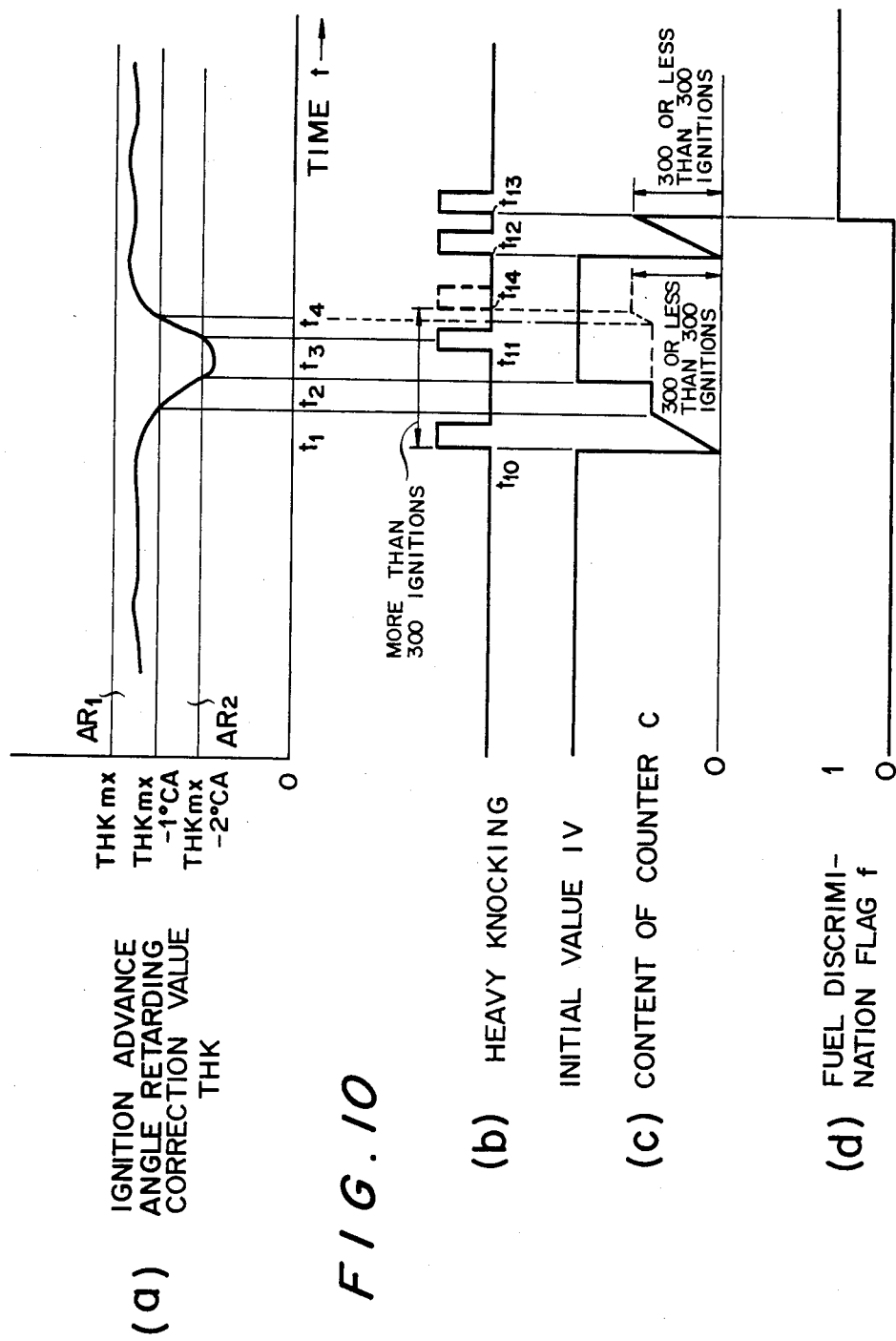

METHOD OF DISCRIMINATING OCTANE NUMBER OF FUEL FOR MOTOR VEHICLE

BACKGROUND OF THE INVENTION

The present invention relates to a method of discriminating a type of a fuel to be supplied being supplied from a fuel tank of a motor vehicle. More particularly, the present invention relates to a method of discriminating an octane number of a fuel in which the octane number of gasoline being supplied to a gasoline engine is discriminated. In other words, in the present invention, determination is made as to whether the gasoline is of a high-octane or a low-octane gasoline.

It is well known to control an ignition timing at which an ignition plug sparks in accordance with an engine rotational speed and an engine load as well as an occurrence of a knocking of the engine. In this case, when the knocking is detected the ignition timing is retarded or approached the top dead center of crank shaft of the engine.

You can access two kinds of gasolines, i.e., high-octane gasoline and low octane gasoline. In this specification, the term low-octane gasoline means that an octane number of the low-octane gasoline is less than that of high-octane gasoline. On the other hand, two kinds of gasoline engines optimized for high-octane gasoline and low-octane gasoline, respectively, are available for the consumer. It is well known that maximum performance of an engine is achieved when the ignition advance angle is advanced to a critical ignition advance angle relating to the knocking of the engine. In case the ignition advance angle is advanced beyond the critical ignition advance angle, the engine would knock.

It is also well known that the more the octane number of the gasoline gets, the more the critical ignition advance angle can get.

In this connection, the following problems may be raised. In case low-octane gasoline is supplied to a gasoline engine designed suitably for the high-octane gasoline, knocking of the engine would frequently occur since an ignition plug may be ignited at the ignition advance angle more than an optimum or critical ignition advance angle for low-octane gasoline. In case the high-octane gasoline is supplied to a gasoline engine designed for use with low-octane gasoline (referred to as the engine for low-octane gasoline), maximum performance of the engine, which is achieved when the low-octane gasoline is used, may not be expected to be obtainable. This is because that the ignition plug may be ignited at the ignition advance angle which is retarded too much with respect to the critical ignition advance angle. More specifically, by supplying high-octane gasoline in the engine for low-octane gasoline, the ignition advance angle could be advanced to the critical ignition advance angle for the high-octane gasoline so that output torque of the gasoline engine increases and exhaust gas temperature decreases resulting in decrease of a fuel injection rate. However, since the gasoline engine for low-octane gasoline provides the ignition advance angle optimum for low-octane gasoline, no critical ignition advance angle for high-octane gasoline is obtainable. This causes the above-mentioned disadvantage.

In order to obviate these disadvantages, there has been proposed in a Japanese Application laid-open No. 57072/1983 an apparatus for controlling an ignition timing in which two tables of ignition timings for high and low octane gasoline are prestored and one of the tables is selected by a driver's switching operation of a switch for selecting of the table. Such a switch may be provided on an instrument panel of the motor vehicle. This apparatus, however, is subjected to the following problem. An erroneous switching operation of the switch for selection of the above table causes the same advantages mentioned above. This is because the driver has to determine which one of high and low-octane gasolines is supplied to the engine so that one of the tables of the ignition timing is selected by switching operation of the switch.

Further, there has been proposed in a Japanese Application laid-open No. 122275/85 an apparatus for controlling an ignition timing in which a determination as to the type of the gasoline to be supplied to the engine is carried out in accordance with a knocking condition of the engine. However, the proposed apparatus necessitates an additional ignition advance angle map for discrimination of the type of the gasoline to be supplied together with a well-known ignition advance angle map for general control of the ignition timing based on an engine operational condition. In determining the type of the gasoline being supplied, the ignition advance angle is selected from the additional ignition advance angle map, at first, and then the ignition plug sparks at the ignition advance angle thus selected. Thereafter determination is made as to whether the knocking of the engine takes place or not. If it is determined that the knocking of the engine takes place, it is found that an undesirable gasoline, e.g., low-octane gasoline is used. Such sequential procedures of discrimination of the gasoline requires a relatively longer period of time.

In addition, in case no additional ignition advance angle map is provided, the ignition advance angle for discrimination of the type of the gasoline has to be calculated from the ignition advance angle for general control of the ignition timing based on the engine operational condition.

Furthermore, the ignition timing control proposed in Japanese Application laid-open No. 122275/85 has further problem which will be described below. The above-mentioned discrimination as to the type of the gasoline is adapted to be repeatedly carried out even after such discrimination has been completed once thereby leading wasteful sequential procedures for discrimination of the type of the gasoline. It should be also noted that the proposed apparatus may be subjected to occurrence of the knocking of the engine immediately after the engine operational condition for knocking control is detected in which the ignition timing is retarded in accordance with occurrence of the knocking of the engine.

SUMMARY OF THE INVENTION

It is an object of the present invention to provide a method of discriminating a type of fuel for motor vehicle obviating the above-mentioned disadvantages.

The method according to the present invention is applicable to an internal combustion engine in which a basic ignition advance angle is determined on the basis of an engine rotational speed and an engine load and retarded in accordance with a knocking of the engine greater than a reference level of the knocking intensity. It is preferable to calculate a correction value for retardation of the basic ignition advance angle and retard the basic ignition advance angle by the correction value thus calculated. The correction value increases by a predetermined value every time the knocking of the engine greater than the reference level is detected until it reaches a maximum value. The basic ignition advance angle is predetermined in such a manner that the engine runs with a maximum performance thereof when a gasoline having a specific octane number, e.g., a high-octane gasoline, is used. The correction value increases to the maximum value when the knocking of the engine takes place frequently due to, for example, usage of a gasoline having an octane number less than the specific octane number, e.g., a low-octane gasoline. The ignition advance angle retarded by the maximum value of the correction value would not prevent the engine from knocking and, besides, a heavy knocking would take place, in case a fuel tank of the engine for the high octane gasoline is filled with the low-octane gasoline. Accordingly, in accordance with a frequency of occurrence of the heavy knocking during the correction value being maximum value, discrimination can be made as to whether the gasoline having the specific octane number is supplied to the engine.

According to a first aspect of the present invention, discrimination is made, in accordance with occurrence of the knocking of the engine, as to whether a gasoline having a specific octane number optimum for the engine is used or not when a correction value for retardation of an ignition advance angle is determined to be within a predetermined range of the correction value. It is preferable to automatically calculate the actual ignition advance angle in accordance with the result of discrimination of the type of the gasoline. A map or schedule for basic ignition advance angle corresponding to the high-octane gasoline or the low-octane gasoline, respectively, may preferably be prestored in a ROM.

The method according to the first aspect of the present invention is advantageous in that even if a different type of gasoline from the gasoline having the specific octane number is partially mixed into the latter gasoline, the type of gasoline is adequately discriminated.

According to a second aspect of the present invention, first and second ranges of the correction value for retardation of the ignition timing for discrimination of the type of the gasoline are predetermined. The first range lies in adjacent to a maximum value of the correction value and the second range lies at the more advanced side of the first range. The correction value is determined as to which of the first and second ranges the correction value is within. When the correction value is determined to be within the first range, determination is made as to whether the knocking of the engine greater than a reference level of knocking (referred to as "heavy knocking" hereinafter) occurs or not. Upon determining the heavy knocking in the first range, a measurement of a frequency of occurrence of such a heavy knocking is started. After such a measurement starts, when the correction value enters to the second range, the measurement is interrupted. Upon returning of the correction value to the first range, the measurement of the frequency of occurrence of the heavy knocking is restarted. When the correction value goes to a range other than the first and second ranges, the result of the measurement is reset.

Preferably, the frequency of occurrence of the heavy knocking is measured by measuring a time interval between two successive heavy knockings. Alternatively, such a frequency may be measured by counting the number of the heavy knockings during a predetermined period of time.

The method according to the second aspect of the present invention is advantageous in that an accuracy of the discrimination of the type of the gasoline is improved.

According to a third aspect of the present invention, it is discriminated, in accordance with the knocking of the engine, as to whether a gasoline being supplied to the engine is a gasoline having a specific octane number for which an ignition timing of the engine is predetermined optimum or a gasoline having an octane number less than the specific octane number.

The result of the discrimination is stored in a storage means, such as a random access memory. A feature of this aspect of the present invention resides in that after the result of the discrimination has been stored in the storage means, no further discrimination as to whether the gasoline to be supplied to the engine is the gasoline having the specific octane number or not, is adapted to be carried out. The result of the discrimination is reset in response to starting of the engine.

The method of the third aspect of the present invention is advantageous in that time period required for discrimination of the type of the gasoline is shortened. Incidentally, in general, while the gasoline is supplied to the engine at a gas station, an ignition key is turned off. Therefore, upon turning on of the ignition key, the discrimination of the type of the gasoline is necessarily carried out, so that adequate ignition timing control and fuel injection control may be carried out in accordance with the result of discrimination.

Further the method of the third aspect of the present invention is also advantageous in that a quickly responsive performance of the engine is obtainable because the discriminating of the type of the gasoline is not repeated after the different type of gasoline from the gasoline optimum for the engine is discriminated.

Each of the methods of discriminating the type of the gasoline to be supplied according to the above-mentioned first and second aspects of the present invention may be combined with the method according to the third aspect of the present invention.

BRIEF DESCRIPTION OF THE DRAWINGS

FIGS. 10(a-d) are a time chart showing a correction value for retardation of an ignition timing, a heavy knocking, a content of a counter and a fuel discrimination flag.

DESCRIPTION OF THE PREFERRED EMBODIMENT

Figure 1:
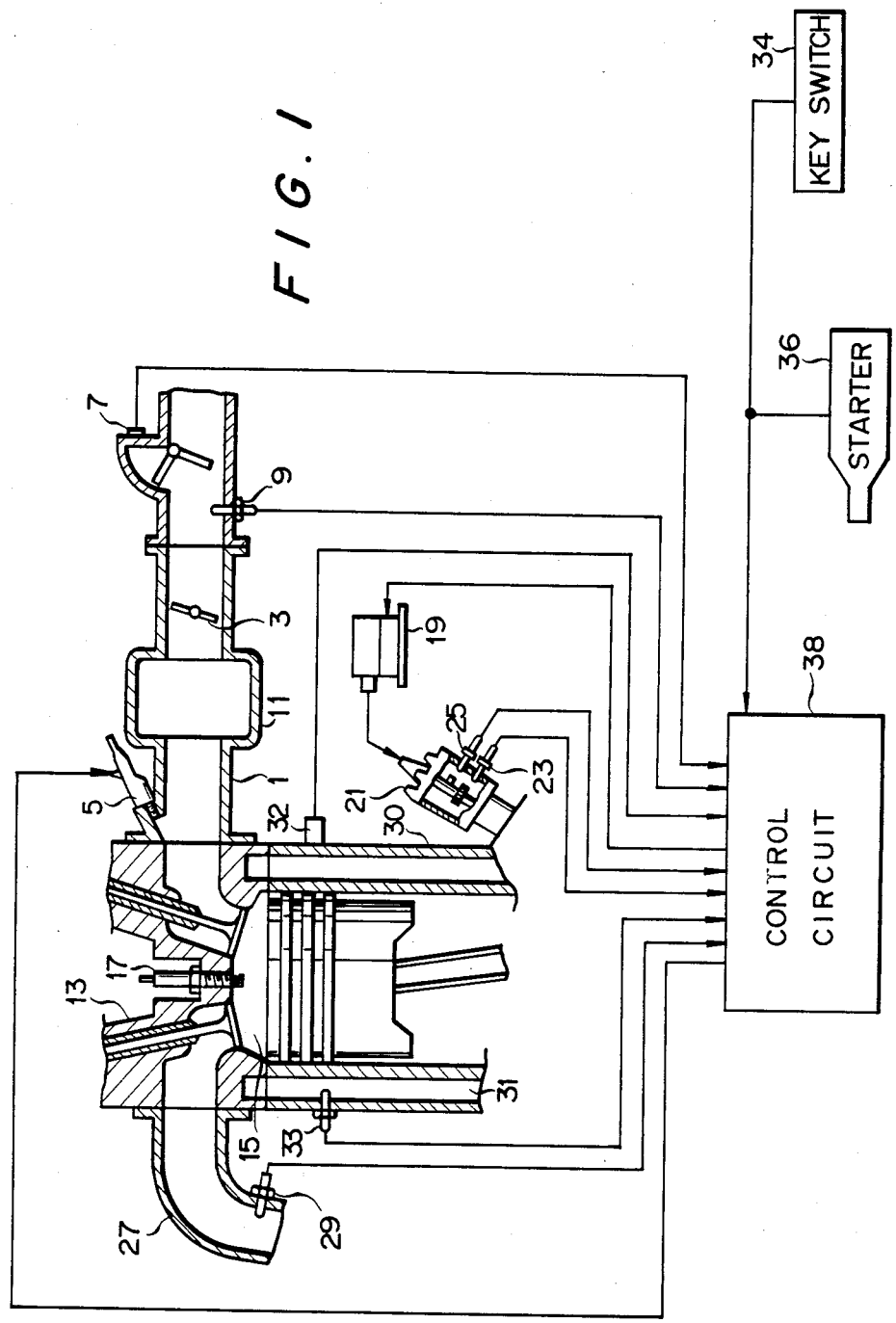
FIG. 1 is a schematic illustration of one example of an engine to which the method according to the present invention is applicable.

Referring to FIG. 1, fuel injectors 5 are provided in an intake pipe 1 at a downstream portion of a throttle valve 3. An intake air quantity is dependent on an open degree of the throttle valve 3 and is measured by an air flow meter 7 which outputs a signal depending upon the intake air quantity. Provided at the downstream portion of the air flow meter 7 is an intake air temperature sensor 9 outputting a signal depending upon an intake air temperature. A surge tank 11 is provided at a downstream portion of the throttle valve 3. Numeral 13 is a conventional internal combustion engine whose ignition plugs 17 spark so as to ignite an air-fuel mixture in a combustion chamber 15 at a certain ignition advance angle prior to the top dead center of each cylinder. Each ignition plugs 17 is applied with a high voltage increased by an ignitor 19 through a distributor 21.

The distributor 21 is provided with a crank angle sensor 23 generating a pulse signal every 30 degree of a rotational angle of a crank shaft (referred to as "30°CA" hereinafter) and a cylinder discriminating sensor 25 generating a pulse signal every 720°(CA).

An exhaust gas produced after combustion in the combustion chamber is exhausted via an exhaust pipe 27 where an $O_2$ sensor 29 generating a signal which depends on the concentration of the oxygen remaining in the exhaust gas. A water temperature sensor 33 is installed at a cylinder block 30 so as to sense a cooling water temperature in a water jacket 31 so that the sensor 33 generates a voltage corresponding to the cooling water temperature. A knocking sensor 32 is also installed at the cylinder block 30 which generates a signal depending on a magnitude of the knocking of the engine. The knocking sensor 32 may be a resonant type vibration sensor which outputs a maximum output in response to a predetermined frequency of vibration of the engine. Further, denoted at 34 and 36 are a key switch and a starter, respectively. Turning on of the key switch 34 causes the starter 36 to be driven and both ignition and fuel injection systems to be enabled. Denoted at 38 is an electronic control circuit whose input port receives a plurality of signals from the sensors, switches and so on.

Figure 2:
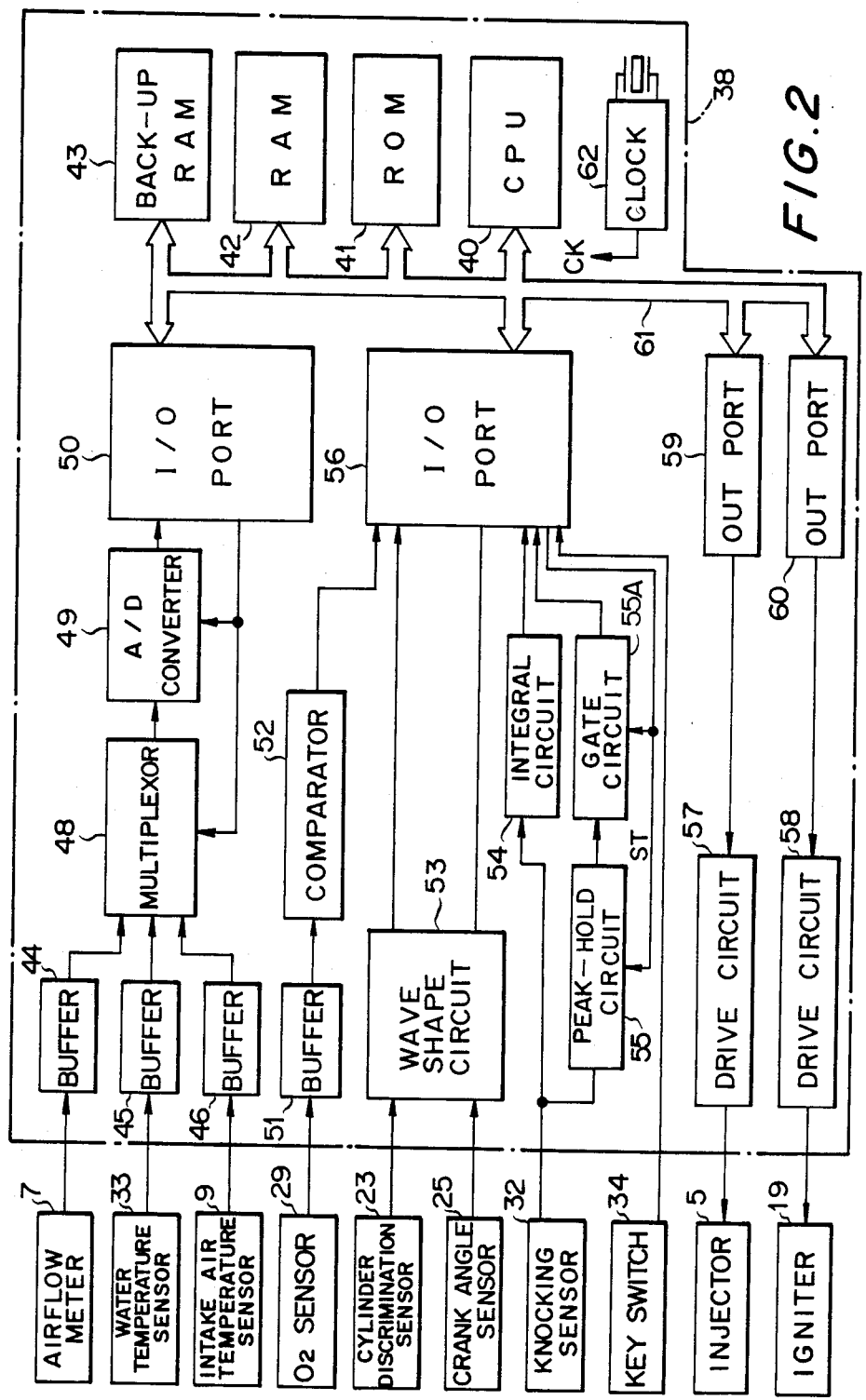
FIG. 2 is a detailed block diagram of an electronic control circuit of the engine shown in FIG. 1.

Referring to FIG. 2, description will be given of the electronic control circuit 38. Denoted at 40 is a central processing unit (CPU) controlling various components so as to successively receive input signals from the sensors, switches and so on, and to carry out a logical and arithmetic operation in accordance with various programs prestored in a read only memory (ROM) 41 which also prestores initial data. Denoted at 42 is a random access memory (RAM) 42 in which various data received by the control circuit 38 and required for logical and arithmetic operation are temporarily written and read out. A back-up memory (BU-RAM) 43 is supplied with electricity from an auxiliary power source, e.g. a battery, when the engine is out of operation, in order to maintain various data required for optimum restarting condition of the engine. Reference numerals 44-46 are buffers for output signals from respective sensors and 48 is a multiplexer successively selecting one of these output signals so as to feed the signal thus selected to the CPU 40. Reference numeral 49 is an analogue-to-digital converter converting the analogue signals into digital signals and 50 is an input/output port through which each digital signal from the A/D converter 49 is fed to CPU 40 and a control signal from CPU 40 is fed to the A/D converter 49 and the multiplexer 48. Denoted at 51 is a buffer through which the output signal from the $O_2$ sensor 29 is fed to a comparator 52. Denoted at 53 is a wave shape circuit shaping the waves of the output signals from the crank angle sensor 23 and the cylinder discriminating sensor 25.

The output of the knocking sensor 32 is fed to an integral circuit 54 and a peak-hold circuit 55 whose output is fed to an input/output port 56 through a gate circuit 55A. In general, knocking of the engine occurs within a range from 30° (CA) to 60° (CA) after the top dead center (TDC) of the crank shaft. A timing signal ST which is fed to the gate circuit 55A and the peak-hold circuit 55 through the input and output port 56, therefore, is generated so that a peak value out of the output of the knocking sensor 32 is taken in within the above range of the rotational angle of the crank shaft.

Figure 3:
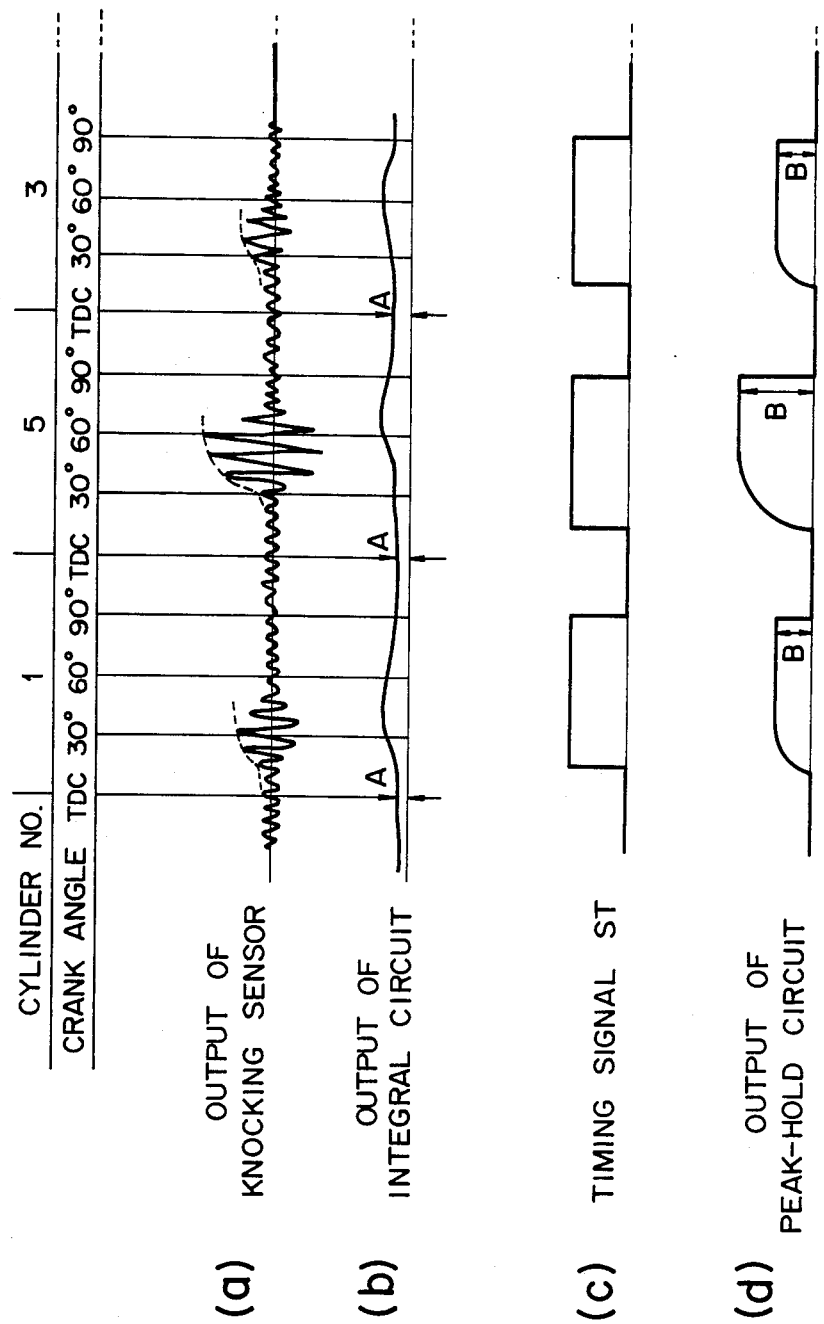
FIGS. 3 (a-d) are a time chart showing output signals from each of elements of a knocking detecting means.

FIG. 3 shows the output signals from the knocking sensor 32, the integral circuit 54 and the peak-hold circuit 55 as well as the timing signal ST for a 6-cylinder gasoline engine. A firing order of the combustion cylinder and the crank shaft rotational angle after the top dead center of each cylinder are indicated along an abscissa of the drawing of FIG. 3. A wave form (a) is indicative of the output of the knocking sensor 32, (b) the output of the integral circuit 54, (c) the timing signal ST and (d) the output of the peak-hold circuit 55. The peak-hold circuit is adapted to be set by the leading edge of the timing signal ST and reset by the trailing edge of the timing signal ST, and the output signal of the peak-hold circuit 55 is adapted to be passed through the gate circuit 55A receiving the timing signal ST being of high level. In this embodiment, the output of the integral circuit 54 at the top dead center of the crank shaft is adapted to be taken in as a background level A and the output thereof at the 90° (CA) after the top dead center of the crank shaft is adapted to be taken in as a knocking signal B.

Referring again to FIG. 2, reference numerals 57 and 58 are drive circuits driving the fuel injectors 5 and the ignitor 19, respectively, by each of signals from CPU 40 via output ports 59 and 60. Denoted at 61 is a bus line for various signals and data and 62 a clock circuit feeding a clock pulse signal at a constant time interval to the CPU 40, ROM 41, RAM 42 and so on.

I. Gasoline engine designed for high-octane gasoline

The following description will be given of sequential procedures for discriminating the type of the gasoline to be supplied to the engine designed for high-octane gasoline. An ignition control and a fuel injection control are carried out according to a result of such a discrimination.

Main routine

Figure 4:
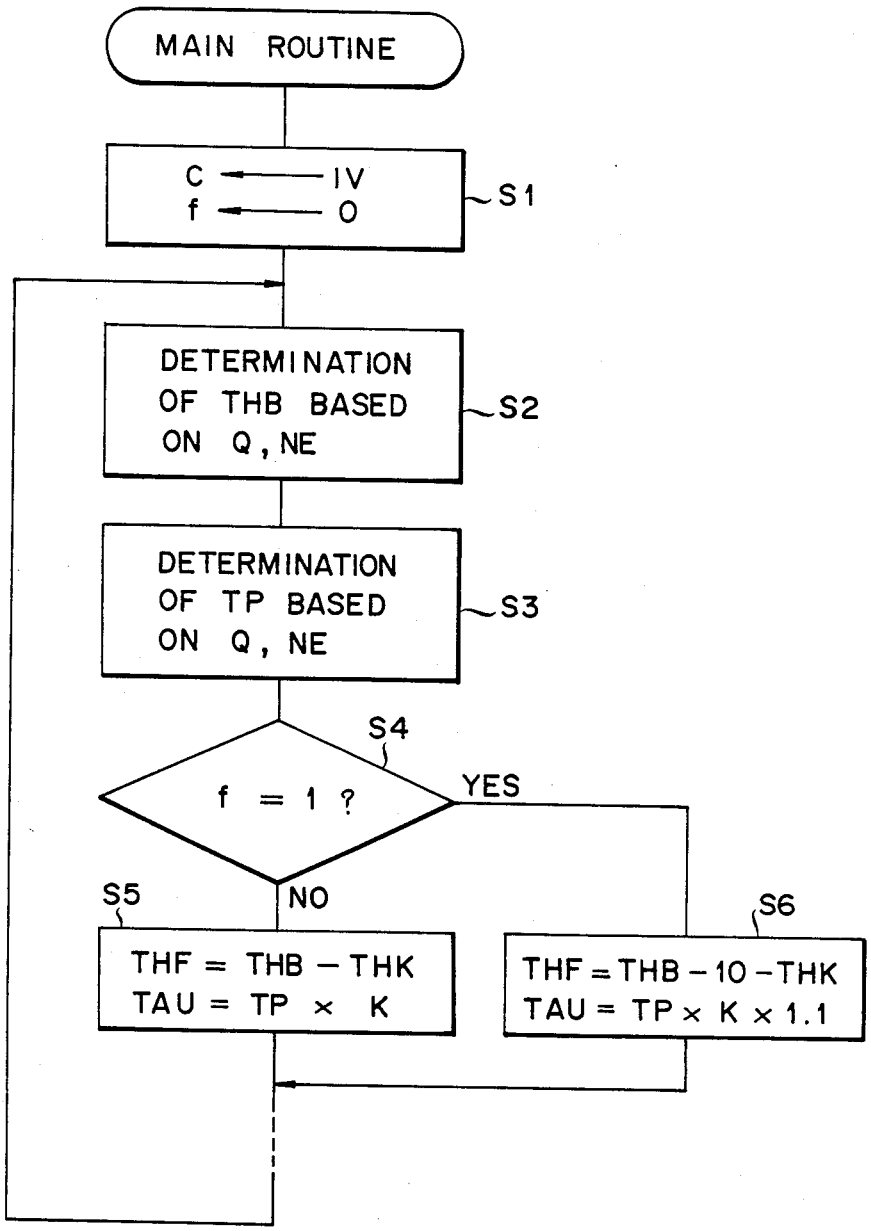
FIGS. 4 and 12 are flow charts of two examples of main routine.

FIG. 4 shows a main routine starting in response to turning on of the key switch 34. In a step S1, a counter which counts the number of ignitions between two successive detections of a heavy knocking, is initialized so that a content C of the counter becomes an initial value IV and a flag f representing the result of discrimination of the type of the gasoline is set to be "0". The main routine is preprogrammed such that the step S1 is carried out only when the key switch 34 is turned on in order to drive the starter 36 and thereafter the step S1 is skipped over. Consequently, the step S1 is carried out again when the key switch 34 is operated again in order to drive the starter after turning off the key switch 34.

In a step S2, a basic ignition advance angle THB is determined in accordance with a relationship between an air flow quantity Q and an engine rotational speed NE. It may be possible to prestore in the ROM 41 a table for basic ignition advance angle THB with respect to relationship between the air flow quantity Q obtained on the basis of the voltage signal from the air-flow meter 7 and the engine rotational speed NE obtained on the basis of the pulse signal from the sensor 23. The process goes to a step S3 in which a basic fuel injection time duration TP is determined in accordance with a relationship between the air flow quantity Q and the engine rotational speed NE. Like the basic ignition advance angle THB, it is preferable to prestore a table for the fuel injection time duration TP with respect to the relationship between the air flow quantity Q and the engine rotational speed NE. In a step S4, determination is made as to whether the flag f is "1" or not. The flag f is used to determine whether the gasoline being supplied to the engine is of high-octane gasoline or low-octane gasoline. The flag f is set to be "1" when it is determined that low-octane gasoline is used in a fuel discriminating routine described hereinafter. That is, flag f "1" is indicative of use of low octane gasoline and the flag f "0" is indicative of use of high-octane gasoline. More specifically, when the octane number of the gasoline in the fuel tank of the engine is less than an allowable certain octane number, the flag f is set to be "1" due to a frequent occurrence of the heavy knocking. The allowable octane number is less than the octane number of the high-octane gasoline. If the octane number of the gasoline in the fuel tank in which low-octane gasoline is mixed with high-octane gasoline is greater than the allowable octane number, it is scarcely possible that the heavy knocking takes place.

If the step S4 is determined to be negative, the process proceeds to a step S5 wherein the following formulas are calculated.

$$THF = THB - THK \quad (1)$$

$$TAU = TP \times K \quad (2)$$

If the step S4 is determined to be affirmative, the process goes to a step S6 wherein the following formulas are calculated.

$$THF = THB - 10° (CA) - THK \quad (3)$$

$$TAU = TP \times K \times 1.1 \quad (4)$$

THF: final injection advance angle
THB: basic injection advance angle for gasoline engine designed suitably for the high-octane gasoline
THK: correction value for retardation of the knocking of the engine
TAU: final fuel injection time duration
TP : basic fuel injection time duration
K correction coefficient for a water temperature, an engine operational condition and so on In addition, the correction value THK is limited to a maximum value THKmx so that the exhaust gas temperature increased due to retardation of the ignition timing is prevented from exceeding a temperature allowable for the engine. The above formula (3) is used when it is determined that the low octane gasoline is supplied, i.e., the octane number of the gasoline in the fuel tank is less than the allowable octane number in the fuel discriminating routine described hereinafter. According to the formula (3), the final ignition advance angle THF is retarded with respect to the final ignition advance angle THF obtained by using formula (1) in view of tendency of the engine to knock due to the low-octane gasoline. As shown in the formula (4), the final fuel injection time duration TAU is increased ten percent over the same obtained by the formula (2), to compensate for the exhaust gas temperature increase and the output torque decrease due to such a retardation of the ignition timing.

In a particular embodiment shown in FIG. 4, the process is adapted to proceed to the step S2 after the step S5 or S6 has been carried out. The ignition and fuel injection are conventionally controlled in accordance with the final ignition advance angle THF and the final fuel injection time duration TAU. The detailed procedures of such controls, therefore, are omitted in this specification.

An additional step where determination is made as to whether the engine operational condition is in a knocking control range or not, e.g. Q/N (Q: air flow quantity, N: engine rotational speed) is 0.7 (l/rev) or greater, may be inserted between the steps S4 and S6. In this case, if the answer in the additional step is affirmative, the process may go to the step S6 and if negative, the process may go to the step S5. This causes the gasoline engine to be driven with a good performance, because no retardation for ignition timing in the step S6 is carried out in a range other than the knocking control range, i.e., a range of a low engine load.

Knocking detection routine

Figure 5:
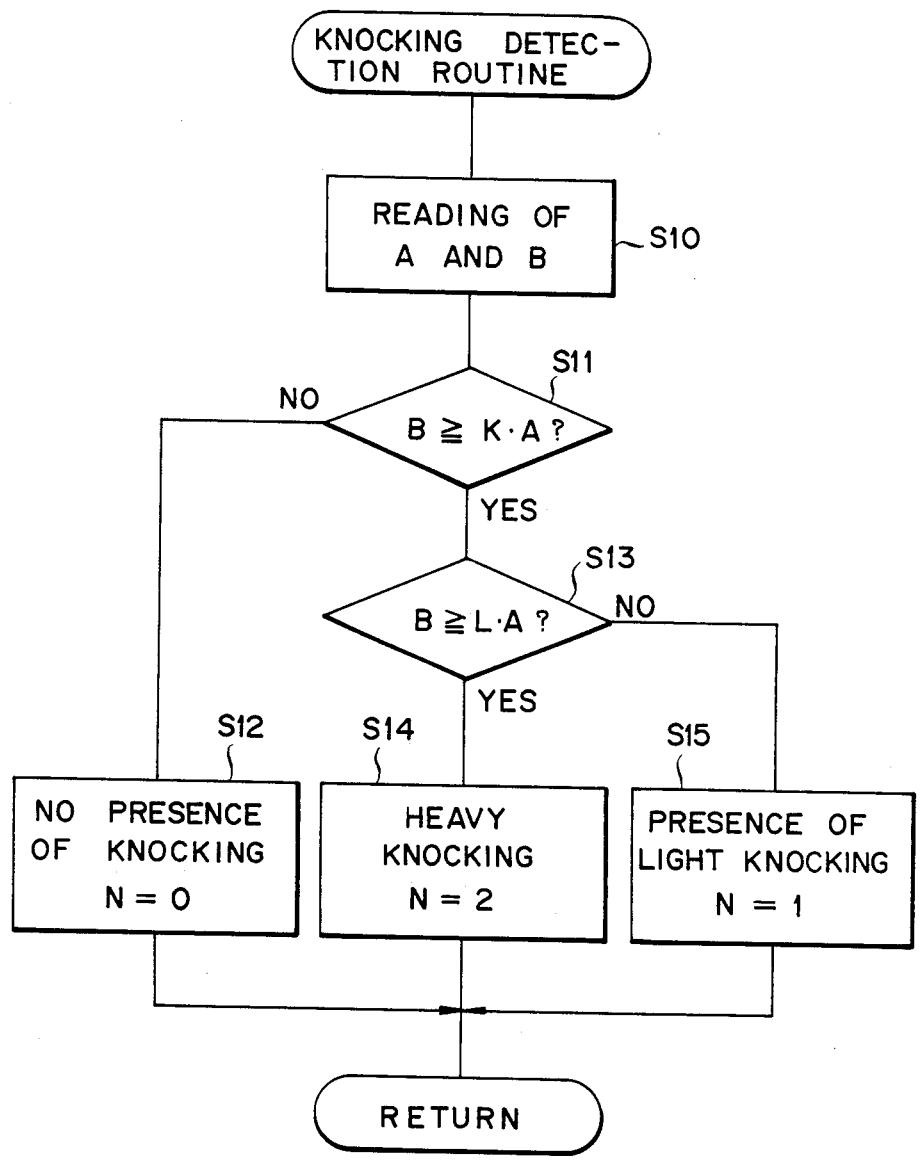
FIG. 5 is a one example of flow chart showing a knocking detection routine.

FIG. 5 shows a knocking detection routine which is programmed in the ROM 41 and used to determine a occurrence of knocking and a magnitude thereof in accordance with the outputs from the integral circuit 54 and the gate circuit 55A. Upon starting this program, a step S10 is firstly carried out where the output of the integral circuit 54 and the output of the peak-hold circuit 55 through the gate circuit 55A are taken in synchronism with the rotational angle of the crank shaft. More specifically, referring to FIG. 3, (b), (d), the output "A" of the integral circuit 54 is taken in at the top dead center of the crank shaft and the output "B" of the gate circuit 55A is taken in at 90° (CA) after the top dead center.

Subsequently, the process proceeds to a step S11 where determination is made as to whether "B" is (K×"A") or greater. K is a constant number and contributes to compensation for different amplification rates of the integral, peak-hold and gate circuits 54, 55 and 55A. In this embodiment, K is multiplied by "A" resulting in a threshold level (K×"A") which is compared with "B". As understood from FIG. 3, the output of the integral circuit 54 at the top dead center of the crank shaft is referred to as the above-mentioned value "A" indicating vibration of the engine 13 other than that caused by knocking or detonation of the engine 13. This is because that it has been known that knocking seldom takes place at the top dead center of the crank shaft. Accordingly, it is determined that when output "B" of the knocking sensor 32 which is held by the peak-hold circuit 55 between 15° (CA) and 90° (CA), is equal to the threshold level (K×"B") or greater, knocking is actually taking place.

If the decision in the step S11 is negative, the process goes to a step S12 where N is set to be "0" indicating no occurrence of knocking. If a decision of this step is affirmative, the process goes to a step S13 where the magnitude of the knocking is determined by using (L×"A"), where L is greater than K. If the output "B" of the knocking sensor 32 is so great that the output "B" is equal to (L×"A") or greater, it is determined in the step S13 that a great vibration in the gasoline engine 13 is occurring, i.e., a heavy knocking is taking place and in turn the process goes to a step S14 where N is set to be "2". If the decision of the step S13 is negative, it is determined that a light knocking is taking place and in turn the process goes to a step S15 where N is set to be "1".

Fuel discrimination routine (1)

Figure 6:
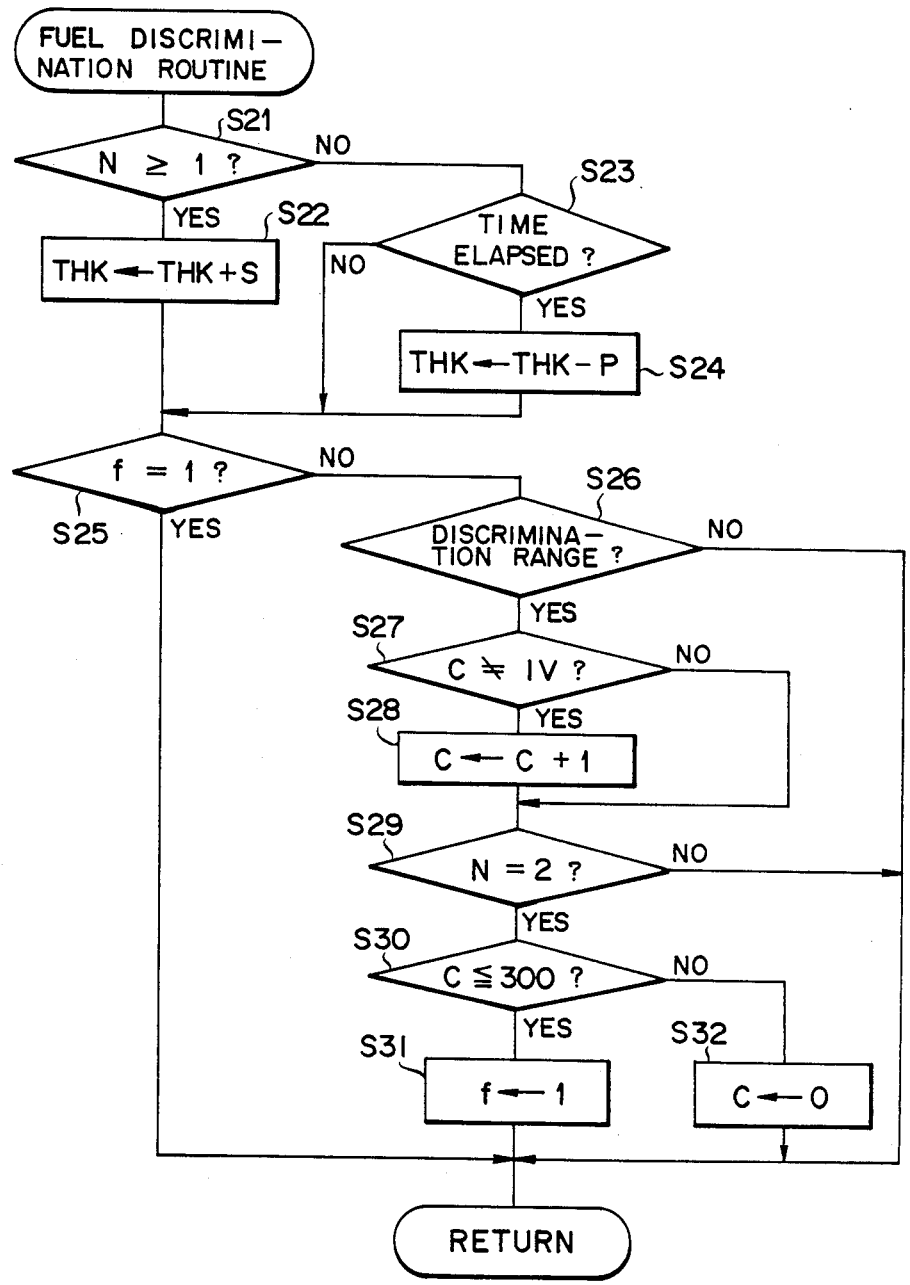
FIGS. 6, 7, 9 and 13 are four examples of a flow chart showing a fuel discrimination routine.

FIG. 6 shows one example of a fuel discrimination routine wherein discrimination is made as to whether the octane number of the gasoline in the fuel tank is less than the allowable octane number. Upon starting this routine at every 120° (CA), the process goes to a step S21 where determination is made as to whether N is "1" or more, i.e., knocking in the engine is taking place or not. If yes, a predetermined value S is added to the correction value THK for retardation of the ignition timing and the result of this addition is to be the new correction value THK causing the ignition timing to be retarded. If no in the step S21, the process goes to a step S23 where determination is made as to whether a predetermined period of time has elapsed after a previous determination of knocking or not. The decision in the step S23 is affirmative and then the process goes to a step S24 where the correction value THK is subtracted by a predetermined value P and the result of this subtraction is to be the new correction value THK.

In a step S25 determination is made as to whether the flag f is "1" or not. As described above, the flag f is set to be "1" when it is determined that the low-octane gasoline is used. After the flag f has been set to be "1" once, the sequential procedures of step S26–S32 are skipped over and this routine is completed. As described above, the flag is reset to be "0" in response to turning on of the key switch 34. The flag f, therefore, is kept at "0" until it is determined that the low-octane gasoline is used through the steps S26–S32.

In the step S26, determination is made as to whether or not the correction value THK is within a discrimination range AR in which discrimination is made as to whether the type of gasoline to be supplied to the fuel tank is of high-octane gasoline or low-octane gasoline. According to this embodiment, the discrimination range AR is set as follows:

$$THKmx - 1° (CA) \leq AR \leq THKmx$$

where, THKmx is the maximum value of the correction value THK. It should be noted that it is preferable to set the discrimination range AR in adjacent to the maximum value THKmx of the correction value.

If the decision in the step S26 is affirmative, the process goes to the step S27 where determination is made as to whether the content C of the counter is an initial value IV or not. When the process goes to the step S27 for the first time, the decision in the step S27 is necessarily negative because the counter is initialized so that the content thereof is the initial value IV at the step S1 shown in FIG. 4, so that the process goes to the step S27. In the step S29, determination is made as to whether N is "2" or not, i.e., the heavy knocking has occurred or not. If the decision in the step S29 is affirmative, determination is made as to whether the content C of the counter is equal to a reference frequency of occurrence of the heavy knocking, e.g., "300" or less in the step S30. "300" means "300" times of ignitions, since the counter is increased by "1" at every ignition. When the process goes to the step S30 for the first time, the decision in the step S30 is necessarily negative because the initial value IV is set to be greater than 300. Therefore, the process goes to the step S32 where the content C of the counter is set to be "0". If the decision in the step S27 is affirmative, the process goes to the step S28 where "1" is added to the content C of the counter and the result of the addition is stored as the new content C of the counter. Thereafter the process goes to the step S29. The decision in the step S30 is affirmative, the flag f is set to be "1".

In short, when it is determined in the step S29 that the heavy knocking occurs for the first time, the counter is started to count the number of ignitions in the step S28. When the subsequent decision in the step S29 is made that the heavy knocking occurs for the second time, determination is made as to whether the content C of the counter indicates 300 or less in the step S30. The content C of the counter being equal to 300 or less represents that the heavy knocking has been taken place frequently, i.e., the low-octane gasoline is mixed into the high-octane gasoline to a certain extent or the fuel tank is filled with the low-octane gasoline. Accordingly, the flag f is set to be "1" in the step S31.

It should be noted that different values of the reference frequency of occurrence of the heavy knocking should be selected instead of "300" mentioned above depending on specifications of the gasoline engine and the knocking sensor to be used as well as different factors relating to the motor vehicle. Although the ignition and the fuel injection are automatically controlled in accordance with the result of discrimination of fuel to be used in the abovementioned embodiment, an audible or a visible output of the result of discrimination may be generated so that the driver selects the ignition and fuel injection control corresponding to the type of fuel thus discriminated.

According to the above-mentioned embodiment of the present invention, the discrimination range AR is defined between the maximum value THKmx of the correction value and THKmx−1° (CA) and the number of the ignitions between two successive heavy knockings are measured by the CPU 40 provided that the correction value THK is in the discrimination range AR. If the measurement indicates the number of the ignitions being 300 or less, the ignition plugs are sparked at the ignition timing determined in accordance with the formula (3) and fuel is injected during the injection time duration determined in accordance with the formula (4). This causes the following advantages over a method (referred to as MX method hereinafter) of discriminating the type of gasoline only when the correction value corresponds to the maximum value THKmx thereof.

(1) In case the fuel tank of the 6-cylinders gasoline engine for high-octane gasoline and the engine is abruptly accelerated:

0.5–4.0 seconds are required until the low-octane gasoline is discriminated to be used according to the present embodiment while 20–30 seconds are required according to the MX method.

(2) In case the fuel in the tankage contains 30% of the high-octane gasoline and 70% of the low-octane gasoline and the 6-cylinders gasoline engine for high-octane gasoline is abruptly accelerated:

2-7 second are required until the low-octane gasoline is determined to be used according to the present embodiment of the present invention while 25-35 seconds are required according to the MX method.

The above advantages are obtained because of provision of the discrimination range AR. The correction value THK is varied depending on the engine operational conditions, such as the engine coolant temperature and what percent of low-octane gasoline is contained in the tank of the motor vehicle. The correction value THK is scarcely maintained at the maximum value THKmx. Consequently, a chance to discriminate the type of the gasoline is restricted to the extent.

Fuel discrimination routine (2)

Another embodiment of the fuel discrimination routine will be explained referring to FIGS. 7 and 8.

Figure 7:
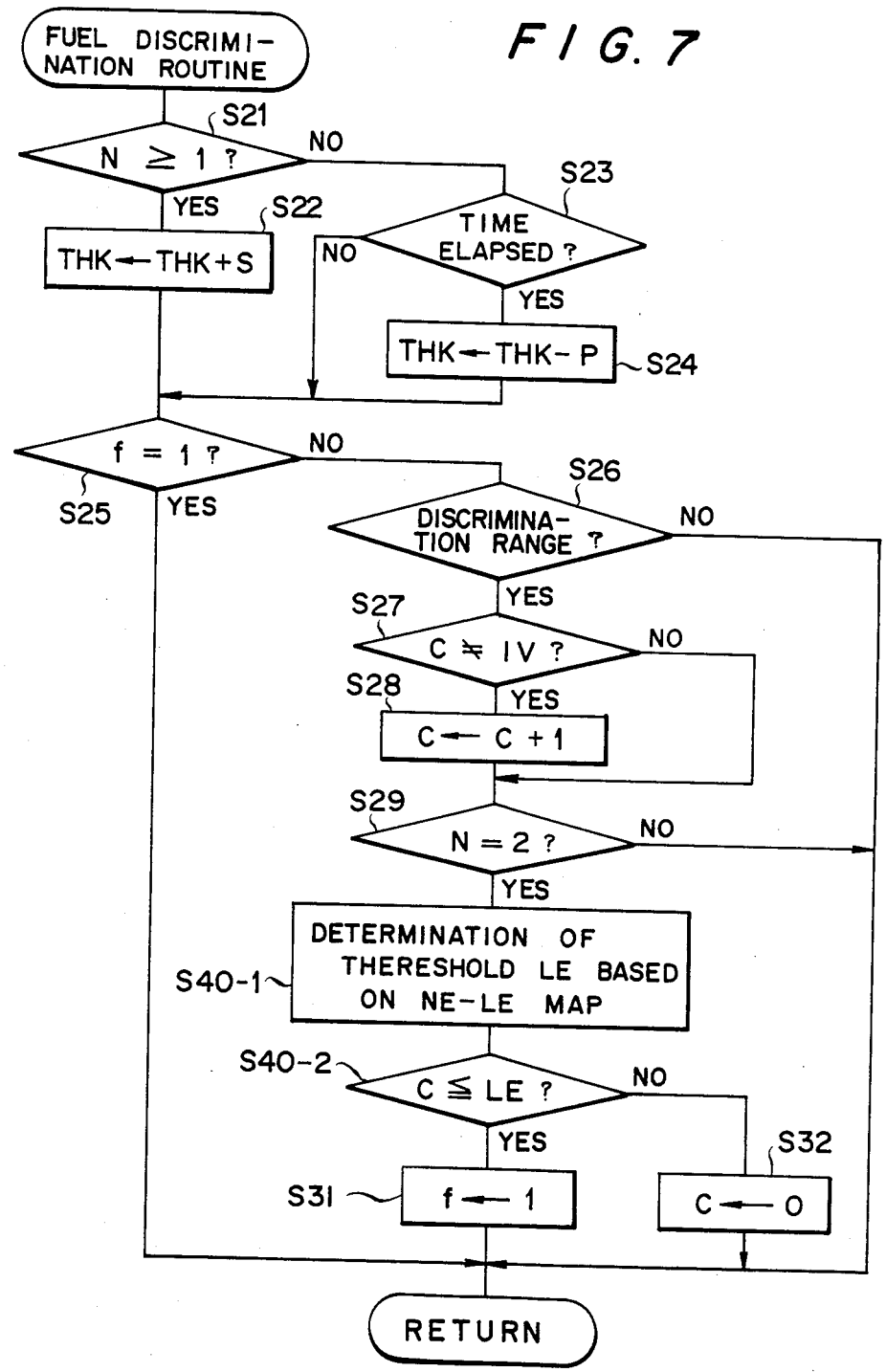

Referring to FIG. 7, the steps identical with the steps shown in FIG. 4 are denoted at the same reference numerals S21-S29, S31 and S32. Minor changes are made with respect to steps S40-1 and S40-2 described hereinafter.

Figure 8:
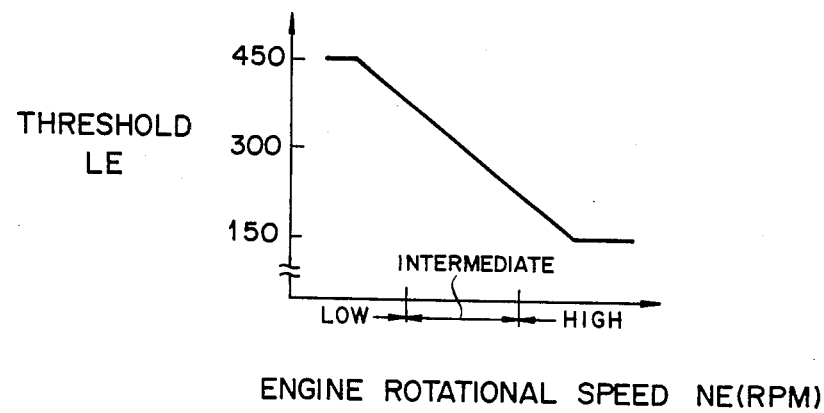
FIG. 8 is a one example of a graph showing a relationship between an engine rotational speed and a reference frequency of occurrence of a heavy knocking.

If an affirmative decision is made in the step S29, the process goes to the step S40-1 where a threshold LE of the frequency of occurrence of the heavy knocking is read out from a map indicating a relationship between engine rotational speed NE-threshold LE stored in ROM 41 as shown in FIG. 8 in accordance with the engine rotational speed NE. Thereafter, the process goes to the step S40-2 where determination is made as to whether the content C of the counter is equal to the threshold LE or less. The flag f indicating the result of fuel discrimination is set to be "1" in the step S31 in response to an affirmative decision in the step S40-2.

As shown in FIG. 8, the threshold LE is predetermined within a range of 150-450 to become smaller as the engine rotational speed NE increases. Accordingly, in a high speed range of the engine rotational speed the low-octane gasoline is discriminated to be used if the heavy knocking considerably frequently takes place. In low and intermediate speed ranges of the engine rotational speed, the low-octane gasoline is discriminated to be used if the heavy knocking takes place somewhat frequently as compared with the high engine speed range.

Such a variation of the threshold LE according to the engine rotational speed is necessitated in view of the following reason.

The higher the engine rotational speed gets, the lower an accuracy of the ignition retarding control based on the detected knocking in the engine gets due to the decrease of S/N ratio of the knocking control system. In consequence, an erroneous detection of knocking whose magnitude is greater than the threshold level of knocking intensity tends to occur in the high engine rotational speed range. Therefore, in the high speed range, the threshold LE is set to be small so that erroneous discrimination of the heavy knocking is avoided to a certain extent. On the other hand, in the low and intermediate speed ranges, the ignition timing is correctly retarded in accordance with the detected knocking because of the knocking control system with a suitable S/N ratio and occurrence of knocking itself decreases due to the low engine load (for example, Q/NE being low). This allows the threshold LE to become greater so that an accuracy of discrimination of the type of gasoline is improved.

Fuel discrimination routine (3)

Figure 9:
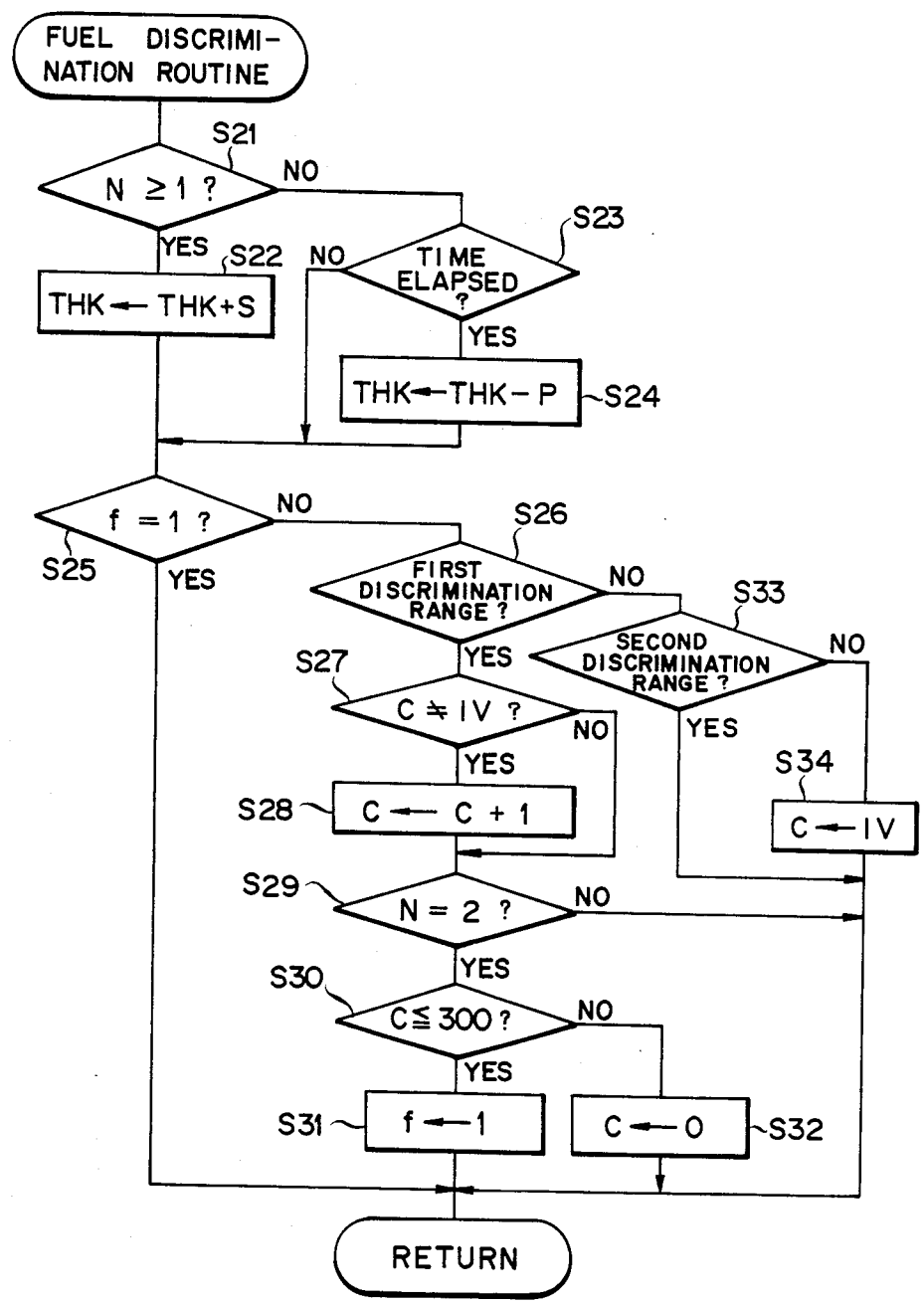

Still another embodiment of the fuel discrimination routine will be explaned hereunder referring to FIG. 9.

Referring to FIG. 9, the steps identical with the steps in FIG. 4 are denoted at the same reference numerals S21-S32. Minor changes are made with respect to steps S33 and S34. In this embodiment, two discrimination ranges AR1 and AR2 are provided. The range AR1 and AR2 are predetermined, respectively, to be as follows:

$$THKmx - 1° (CA) \leq AR1 \leq THKmx$$

$$THKmx - 2° (CA) \leq AR2 < THKmx - 1° (CA)$$

If the negative decision in the step S26 is obtained, the process goes to a step S33 where determination is made as to whether the correction value THK is within the second range AR2 or not. If yes in the step S33, no following step is carried out and if no, the process goes to a step S34 where the counter is set to be an initial value "IV". The correction valve THK being in the first range AR1 allows the steps S33 and S34 to be skipped over, so that discrimination of fuel is carried out through the steps S27-S32.

In short, when decision is made in the step S29 that the heavy knocking occurs for the first time, the counter is started to count the number of ignitions in the step S28. When the subsequent decision in the step S29 is made that the heavy knocking occurs for the second time, determination is made as to whether the content C of the counter indicates 300 or less in the step S30. The content C of the counter being equal to 300 or less represents that the heavy knocking has been taken place frequently, i.e., the low-octane gasoline is mixed into the high-octane gasoline to a certain extent or the fuel tank is filled with the low-octane gasoline. Accordingly, the flag f is set to be "1" in the step S31.

If the correction value THK decreases to the second range AR2 (THKmx−2° (CA)≦THK<THKmx−1° (CA)) after the counter has been started to count the number of the ignitions, the process goes to the step S33 via the step S26 and then terminates. Thus, the counter is interrupted to count the number of the ignitions so that the content of the counter is maintained as it is. On the other hand, if the correction valve THK is to be less than (THKmx−2° (CA)), the process goes to the step S34 via the steps S26 and S33 so that the content C of the counter is set to be the initial value IV.

Referring to FIG. 10, operation according to the fuel discrimination routine shown in FIG. 9 will be explained in detail.

It is assumed that the correction value THK varies as shown in FIG. 10(a) and the heavy knocking takes place as shown in FIG. 10(b). The counter is reset to be "0" in response to the determination of the heavy knocking at a time point t10 as shown in FIG. 10(b) so that the counter is started to be incremented by "1" in response to the successive ignitions. When the range AR1 of the correction value THK is changed to the range AR2 thereof, the counter is interrupted to count the number of the ignitions so that the content C of the counter is maintained as it is (from $t_1$ to $t_2$). When the correction value THK decreases to a value lying in a range other than the ranges AR1 and AR2 at a time point $t_2$, the counter is set to be the initial value IV so that the counter is stopped to count the number of the ignitions. The determination of the heavy knocking at a time point $t_{11}$ does not reflect on the content C of the counter because the correction value is deviated from the range AR1. Contrary to this the determination of the heavy knocking at a time point $t_{12}$ reflects on the content C of the counter in such a manner that the counter is set to be "0" so as to start counting the number of the ignitions because the correction value THK is in the range AR1 after a time point $t_4$. When the content C of the counter is equal to "300" or less at a time point $t_{13}$ at which the heavy knocking is determined to take place, the flag f is set to be "1" indicating that the octane number of the gasoline to be supplied to the fuel tank is less than the predetermined octane number for which the gasoline engine is designed.

It should be noted that like the fuel discrimination routine (1), the different values of the reference frequency of occurrence of the heavy knocking could be selected instead of "300" mentioned above and the audible or the visible output may be generated so that the driver selects the ignition and fuel injection control corresponding to the type of fuel thus discriminated. A timer may be use to measure a time interval between successive heavy knockings in place of usage of the counter counting the number of the ignitions between the successive heavy knockings.

The present embodiment in which the second range AR2 of the correction value THK is provided in addition to the first range AR1 is advantageous in that erroneous discrimination as to whether the octane number of the gasoline to be supplied is less than the predetermined octane number is avoided. More specifically, (1) in case no second range AR2 is provided, the content C of the counter is maintained as it is when the correction value THK is deviated from the first range AR1 and thereafter the counter is restarted to count the number of the ignitions when it is determined that the heavy knocking takes place. Namely, the content C of the counter is indicated by a dotted line shown in FIG. 10(c). In short, although more than 300 ignitions have been taken place between the time points $t_{10}$ and $t_{14}$, the content C of the counter is 300 or less because the counter is interrupted not to count the ignitions until the time point $t_4$ so as not to be initiated. In consequently, erroneous discrimination of the gasoline is made.

Figure 11:
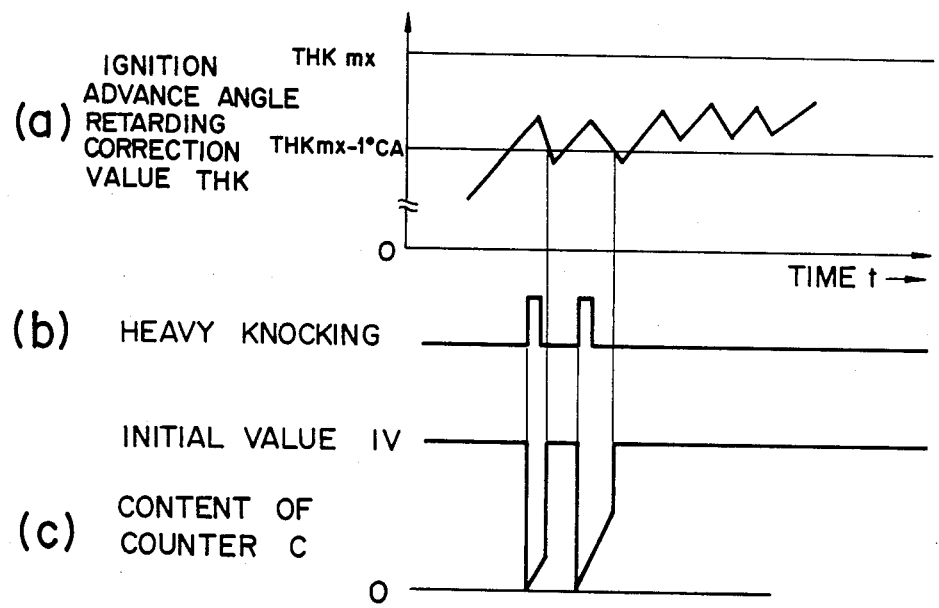
FIGS. 11(a-c) are a time chart showing a correction value for retardation of an ignition timing, a heavy knocking and a content of a counter.

(2) In case no second range AR2 is provided and the counter is set to be the initial value when the correction value THK is deviated from the range AR1, the content C of the counter is shown in FIG. 11(c). In short, even if two successive heavy knockings take place during a short period of time during which 300 or less ignitions take place, the content C of the content may indicates more than 300 or the initial value IV. Therefore, a correct discrimination of the gasoline to be used is not expected.

II. Gasoline engine designed for low-octane gasoline

The following description will be given of sequential procedures for discriminating a type of a gasoline to be supplied to the engine designed for low-octane gasoline. In such an engine, an ignition control and a fuel injection control can be carried out according to a result of such a discrimination.

Main routine

Figure 12:
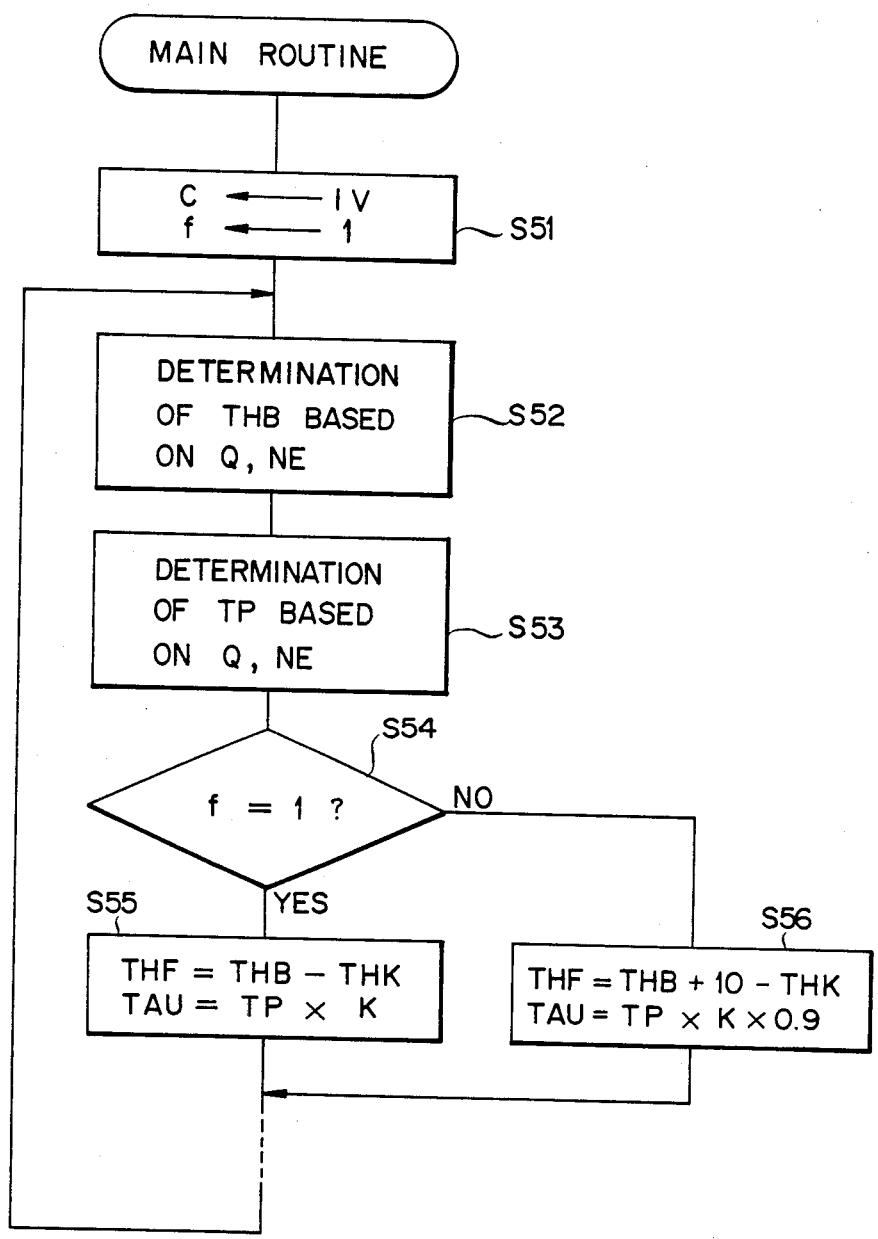

FIG. 12 shows a main routine starting in response to turning on of the key switch 34. In a step S51, a counter which measures a period of time during which no knocking takes place, is initialized so that a content C of the counter becomes an initial value IV being "0" and a flag f indicating the result of discrimination of the type of the gasoline is set to be "1". The main routine is preprogrammed such that the step S51 is carried out only when the key switch 34 is initially turned on and thereafter it is skipped over. Consequently, the step S51 is carried out again when the key switch 34 is operated again to be turned on after turning off the key switch 34.

In steps S52 and S53, the basic ignition advance angle THB and the basic fuel injection time duration TP are determined, respectively, as described above as to the steps S2 and S3 in FIG. 4. Each of the basic ignition advance angle THB and the basic fuel injection time duration TP is predetermined for a gasoline engine designed for low-octane gasoline.

The process goes to a step S54 where determination is made as to whether the flag 1 is "1" or not. If an affirmative decision in the step S54 is obtained, the process goes to a step S55 where the following formulae are carried out.

$$THF = THB - THK \quad (5)$$

$$TAU = TP \times K \quad (6)$$

If a negative answer is obtained in the step S54, the process goes to a step S56 wherein the following formulae are carried out.

$$THF = THB + 10°(CA) - THK \quad (7)$$

$$TAU = TP \times K \times 0.9 \quad (8)$$

The above alphabetic references are identical with those described hereinbefore with respect to the formulae (1)–(4). Since it is well known to control the ignition timing and the fuel injection in accordance with the final ignition advance angle THF and the fuel injection time duration TP, description of such controls is omitted in the following description.

The formula (7) is used when descrimination of gasoline is made that the high-octane gasoline is supplied to the engine designed for low-octane gasoline, so that the final ignition advance angle THF is advanced by 10°(CA) with respect to the final ignition advance angle THF obtained by the formula (5). This can be done because the engine for low-octane gasoline is unlikely to knock due to usage of the high-octane gasoline. In particular case, the ignition advance angle is advanced to optimum such that the engine performance is improved and the exhaust gas temperature is decreased. The formula (8) contemplates that fuel consumption is improved. This improvement can be done because 10°(CA) of advancement of the ignition timing allows the engine cooling water temperature to be decreased necessarily so that no fuel increase for decrease of the water temperature is required, and allows the engine torque to be increased.

Fuel discrimination routine

Figure 13:
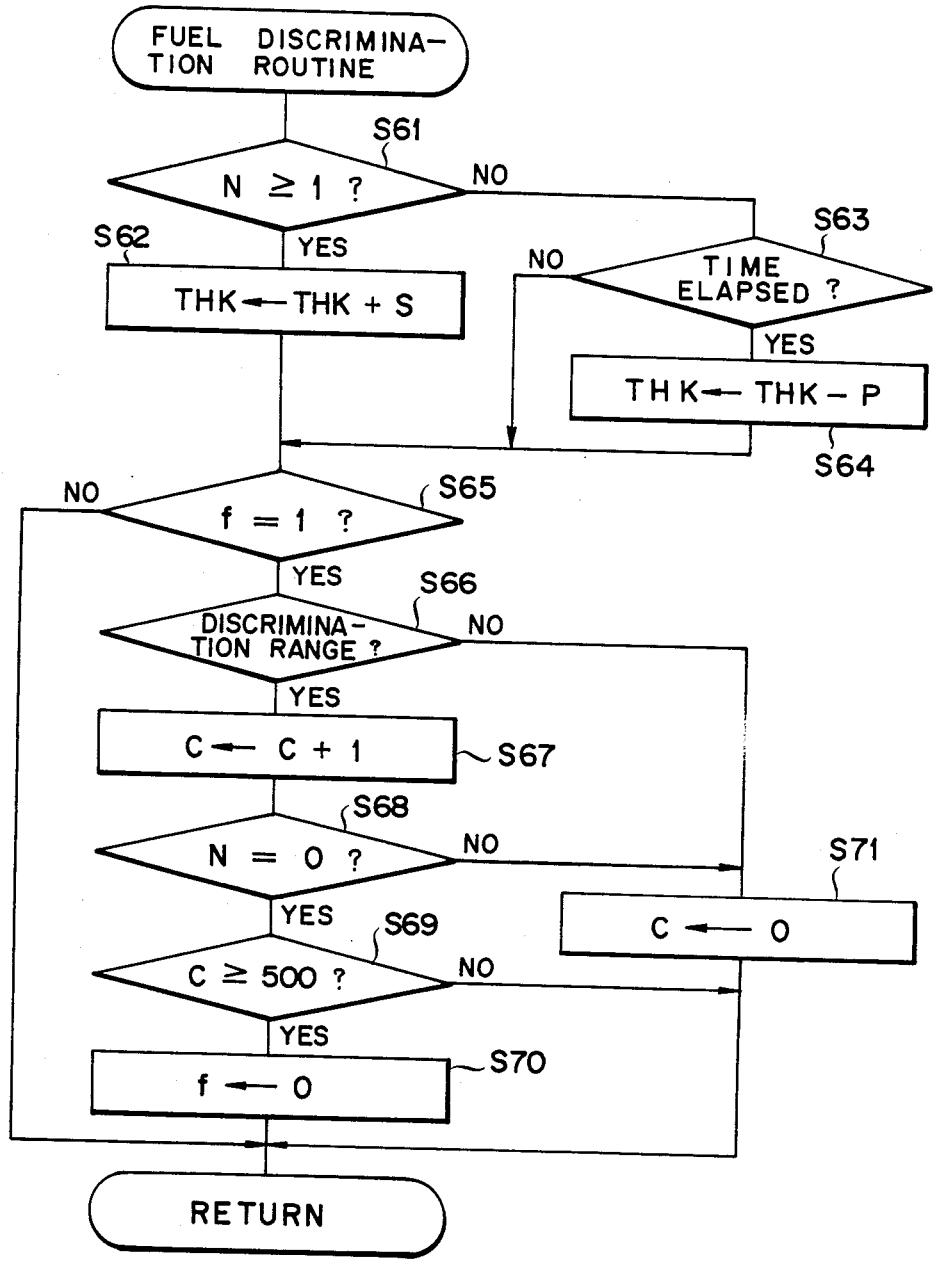

FIG. 13 shows a fuel discrimination routine which is preprogrammed for the gasoline engine designed for low-octane gasoline and is started at every 120 degree of the rotational angle of the crank shaft. In FIG. 13, steps S61–S64 are identical with the steps S21–S24 and therefore the explanation thereof is omitted hereinafter.

When the process goes to a step S65, determination is made as to whether the flag f is "1" or not. If an affirmative answer is made, respective steps S66–S71 are sequentially carried out in order that determination is made as to which the octane number of the gasoline to be used is high or low. If a negative decision in the step S65 is made, the procedure is terminated without carrying out these steps S65-S71. It should be noted that the flag f is set to be "1" in response to turning on of the key switch 34 and to be "0" when it is discriminated that no knocking greater than the reference level of knocking takes place during a predetermined period of time.

In the step S66, determination is made as to whether the correction value THK is within a discrimination range AR3 which is set as follows:

THK min (=0) ≦ AR3 ≦ THK min + 1°(CA)

where, THK min is the minimum value of the correction value THK. It is preferable to set the discrimination range AR3 in the vicinity of the minimum value THK min of the correction value. If a negative answer is made in the step S66, the process goes to the step S71 where the content C of the counter is set to be "0". If an affirmative answer is made in the step S66, the process goes to the step S67 where the content C of the counter is increased by one. In the step S68, determination is made as to whether or not the number N is "0", i.e., no knocking in the engine takes place. The number N is set depending on the knocking conditions as described above and "N=0" represents no occurrence of knocking, "N=1" occurrence of the light knocking and "N=2" occurrence of the heavy knocking. If a decision of the step S68 is negative, the process goes to the step S71 where the content C of the counter is set to be "0" and the counter is started to count the number of the ignitions. If a decision of the step S68 is affirmative, determination is made as to whether the count C of the counter is equal to "500" or more in the step S69. If yes in the step S69, the process goes to the step S70 where the flag f is reset to be "0" and if no, the step S70 is skipped over so that this programme is terminated.

In short, when no occurrence of knocking or "N=0" is continued until the counter counts up to at least 500, it is determined that relatively large amount of the high-octane gasoline is mixed into the low-octane gasoline or the fuel tank is filled with the high-octane gasoline, resulting in the flag f being "0" in the step S70.

In addition, the above description is made with respect to the 6 cylinders engine and the routine shown in FIG. 13 is started at every 120°(CA). Therefore, the content C of the counter is indicative of the number of the ignitions. The above mentioned reference value "500" may be changed to a suitable value depending on the specifications of the gasoline engine and so on, and the reference value may be as function of the engine rotational speed NE as shown in FIG. 8.

What is claimed is:

1. A method of discriminating an octane number of fuel for motor vehicle having an electronic ignition timing control system wherein a basic ignition advance angle is determined in accordance with an engine operational condition so as to be optimum for a predetermined octane number and is corrected by using a correction value for retardation of the ignition timing, said correction value calculated in accordance with a knocking condition of an engine, said method comprising the steps of:
    determining whether said correction value is within a reference range of the correction value; and
    determining whether an octane number to fuel being supplied to the engine is within an allowable range with respect to said predetermined octane number in accordance with said knocking condition of the engine.

2. A method of discriminating an octane number according to claim 1 wherein said predetermined octane number is of a high-octane number and said reference range is set in vicinity of the maximum value of the correction value for retardation of the ignition timing.

3. A method of discriminating an octane number according to claim 1 wherein said predetermined octane number is of a low-octane number and said reference range is set in vicinity of the minimum value of the correction value for retardation of the ignition timing.

4. A method of discriminating an octane number of fuel for motor vehicle having an electronic ignition timing control system wherein a basic ignition advance angle is determined in accordance with an engine operational condition so as to be optimum for a predetermined octane number and is corrected by using a correction value for retardation of the ignition timing, said correction value calculated in accordance with a knocking condition of an engine, said method comprising the steps of:
    determining whether said correction value is within a first reference range adjacent to a maximum value of said correction value;
    determining whether said correction value is within a second reference range lying at the advance side of said first range;
    measuring a frequency of occurrence of knocking greater than a reference knocking intensity when said correction value is determined to be within said first reference range;
    interrupting said measurement when said correction value within said first reference range is decreased to a value within said second reference range;
    restarting said measurement when said correction value within said second reference range is increased to a value within said first reference range; and
    canceling a result of said measurement when said correction value is moved to a range deviated from said first and second reference ranges; whereby when said monitored frequency is higher than a reference frequency it is determined that the octane number of the fuel to be supplied to the engine is less than said predetermined octane number.

5. A method of discriminating an octane number according to claim 4, wherein said measuring step includes the steps of:
    determining as to whether a heavy knocking greater than a greater reference level of knocking intensity is taking place in the engine;
    measuring a time interval from the determination of the heavy knocking for the first time to the determination thereof for the second time; and
    comparing said measured time interval with a reference time interval, whereby when said measured time interval is less than said reference time interval it is determined that the octane number of the fuel to be supplied to the engine is less than said predetermined octane number.

6. A method of discriminating an octane number according to claim 4, wherein said first reference range lies between the maximum value THKmx of said correction value for retardation of the ignition timing and (THKmx−1°(CA)), and said second reference range lies between (THKmx−1°(CA)) and (THKmx−2°(CA)), where CA represents degrees of a rotational angle of a crank shaft.

7. A method of discriminating an octane number according to claim 5, wherein said first reference range lies between the maximum value THKmx of said correction value for retardation of the ignition timing and (THKmx−1°(CA)), and said second reference range lies between (THKmx−1°(CA)) and (THKmx−2°(CA)), where CA represents degree of a rotational angle of a crank shaft.

8. A method of discriminating an octane number according to claim 4, wherein said method further comprises the steps of:
   storing a result of discriminating the fuel; and
   canceling said result in response to starting of the engine and wherein said discriminating step is skipped over when said result is indicative of low-octane gasoline.

9. A method of discriminating an octane number according to claim 5, wherein said method further comprises the steps of:
   storing a result of discriminating the fuel; and
   canceling said result in response to starting of the engine and wherein said discriminating step is skipped over when said result is indicative of the low-octane gasoline.

10. A method of discriminating an octane number of fuel for motor vehicle having an electronic ignition timing control system wherein a basic ignition advance angle is determined in accordance with an engine operational condition so as to be optimum for a predetermined octane number and is corrected by using a correction value for retardation of the ignition timing, said correction value calculated in acordance with a knocking condition of an engine, said method comprising the steps of:
   determining whether an octane number of the fuel being supplied to the engine is within an allowable range with respect to said predetermined octane number in accordance with said knocking condition of the engine;
   storing the result of the determining step; and
   canceling said result in response to starting of the engine, wherein said determining step is skipped over when said result is indicative of an octane number deviated from said allowable range.

11. A method of discriminating an octane number according to claim 10, wherein said predetermined octane number is of a high-octane number and said reference range is set in vicinity of the maximum value of the correction value for retardation of the ignition timing.

12. A method of discriminating an octane number according to claim 10, wherein said predetermined octane number is of a low-octane number and said reference range is set in vicinity of the minimum value of the correction value for retardation of the igition timing.

13. A method of discriminating an octane number according to claim 10, wherein said determining step includes the steps of:
   determining whether a heavy knocking greater than a high reference level of knocking intensity is taking place in the engine;
   monitoring a frequency of occurrence of said heavy knocking; and
   comparing said monitored frequency with a reference frequency; whereby when said monitored frequency is greater than said reference frequency, it is determined that the fuel being supplied to the engine is of the low-octane gasoline.

14. A method of discriminating an octane number according to claim 10, wherein said discriminating step includes the steps of:
   determining whether a knocking of the engine greater than a small reference level of knocking intensity takes place;
   monitoring a frequency of occurrence of said knocking; and
   comparing said monitored frequency with a reference frequency; whereby when said monitored frequency is lower than said reference frequency, it is discriminated that the fuel being supplied to the engine is of the high-octane gasoline.

15. A method of discriminating an octane number according to claim 13, wherein said knocking determining step includes the steps of:
   measuring a time interval between two successive determinations of the heavy knocking; and, in said comparing step, comparing the measured time interval with a reference time interval, whereby when said measured time interval is shorter than said reference time interval it is determined that the octane number of the fuel being supplied to the engine is less than said predetermined octane number.

16. A method of discriminating an octane number according to claim 14, wherein said monitoring step includes the steps of:
   measuring a time interval between two successive determinations of the knocking, and in said comparing step comparing said measured time interval with a reference time interval, whereby when said measured time interval is longer than said reference time interval it is determined that an octane number of the fuel being supplied to the engine is greater than said predetermined octane number.

17. A method of discriminating an octane number of fuel for motor vehicle having an electronic ignition timing control system wherein a basic ignition advance angle is determined in accordance with an engine operational condition so as to be optimum for a predetermined high-octane number and is corrected by using a correction value for retardation of the ignition timing, said correction value calculated in accordance with a knocking condition of an engine, said method comprising the steps of:
   determining whether said correction value is within a reference range of the correction value, said reference range being set in the vicinity of the maximum value of the correction value for retardation of ignition timing; and
   determining whether an octane number of fuel being supplied to the engine is within an allowable range with respect to said predetermined octane number in accordance with said knocking condition of the engine, said octane number determining step in- cluding the substeps of:
   determining whether heavy knocking greater than a reference level of knocking intensity is taking place in the engine;
   monitoring the frequency of occurrence of said heavy knocking; and
   comparing said monitored frequency with a reference frequency; whereby when said monitored frequency is greater than said reference frequency, it is determined that the fuel being supplied to the engine is low-octane fuel.

18. A method of discriminating an octane number according to claim 17, wherein said reference range lies between the maximum value THKmx of said correction value for retardation of the ignition timing and (THKmx−1°(CA)), where CA represents degrees of a rotational angle of a crank shaft.

19. A method of discriminating an octane number according to claim 17, wherein said method further comprises the steps of:
   storing the result of said octane number determining step; and
   canceling said result in response to starting of the engine and wherein said octane number determining step is skipped over when said result is indicative of low-octane gasoline.

20. A method of discriminating an octane number according to claim 17, wherein said reference frequency of occurrence of knocking is predetermined as function of the engine rotational speed.

21. A method of discriminating an octane number according to claim 20, wherein said reference frequency is predetermined to become smaller as the engine rotational speed becomes higher.

22. A method of discriminating an octane number of fuel for motor vehicle having an electronic ignition timing control system wherein a basic ignition advance angle is determined in accordance with an engine operational condition so as to be optimum for a predetermined low-octane number and is corrected by using a correction value for retardation of the ignition timing, said correction value calculated in accordance with a knocking condition of an engine, said method comprising the steps of:
   determining whether said correction value is within a reference range of the correction value, said reference range being set in the vicinity of a minimum value of the correction value for retardation of ignition timing;
   determining whether an octane number of fuel being supplied to the engine is within an allowable range with respect to said predetermined octane number in accordance with said knocking condition of the engine, said octane number determining step including the substeps of:
      determining whether knocking greater than a reference level of knocking intensity is taking place;
      monitoring the frequency of occurrence of said knocking; and
      comparing said monitored frequency with a reference frequency; whereby when said monitored frequency is lower than said reference frequency, it is determined that the fuel being supplied to the engine is high-octane fuel.

23. A method of discriminating an octane number according to claim 22, wherein said referenced range lies between the minimum value THK min of the correction value for retardation of the ignition timing and (THK min+1°(CA)), where CA represents degrees of crankshaft rotation angle.

24. A method of discriminating an octane number according to claim 22, wherein said method further comprises the steps of:
   storing the result of said determining step; and
   canceling said result in response to starting of the engine and wherein said octane number determining step is skipped over when said result is indicative of the high-octane number.

25. A method of discriminating an octane number according to claim 22, wherein said reference frequency of occurrence of knocking is predetermined as function of the engine rotational speed.

26. A method of discriminating an octane number of fuel for motor vehicle having an electronic ignition timing control system wherein a basic ignition advance angle is determined in accordance with an engine operational condition so as to be optimum for a predetermined high-octane number and is corrected by using a correction value for retardation of the ignition timing, said correction value calculated in accordance with a knocking condition of an engine, said method comprising the steps of:
   determining whether said correction value is within a reference range of the correction value, said reference range lying between the maximum value THKmx of said correction value for retardation of the ignition timing and (THKmx−1°(CA)), where CA represents degrees of a rotational angle of a crank shaft; and
   determining whether an octane number of fuel being supplied to the engine is within an allowable range with respect to said predetermined octane number in accordance with said knocking condition of the engine.

27. A method of discriminating an octane number of fuel for motor vehicle having an electronic ignition timing control system wherein a basic ignition advance angle is determined in accordance with an engine operational condition so as to be optimum for a predetermined low-octane number and is corrected by using a correction value for retardation of the ignition timing, said correction value calculated in accordance with a knocking condition of a engine, said method comprising the steps of:
   determining whether said correction value is within a reference range of the correction value, said reference range lying between the minimum value THKmin of the correction value for retardation of the ignition timing and (THKmin+1°(CA)), where CA represents degrees of crankshaft rotation angle; and
   determining whether an octane number of fuel being supplied to the engine is within an allowable range with respect to said predetermined octane number in accordance with said knocking condition of the engine.

28. A method of discriminating an octane number of fuel for motor vehicle having an electronic ignition timing control system wherein a basic ignition advance angle is determined in accordance with an engine operational condition so as to be optimum for a predetermined octane number and is corrected by using a correction value for retardation of the ignition timing, said correction value calculated in accordance with a knocking condition of an engine, said method comprising the steps of:
   determining whether said correction value is within a reference range of the correction value;
   determining whether an octane number of fuel being supplied to the engine is within an allowable range with respect to said predetermined octane number in accordance with said knocking condition of the engine;
   storing the result of said octane number determining step; and
   canceling said result in response to starting of the engine and wherein said octane number determining step is skipped over when said result is indicative of the octane number deviated from said allowable range.

* * * * *